United States Patent
Kim et al.

(10) Patent No.: US 9,684,830 B2
(45) Date of Patent: Jun. 20, 2017

(54) AUTOMATIC TARGET SELECTION FOR MULTI-TARGET OBJECT TRACKING

(71) Applicant: Intel Corporation, Santa Clara, CA (US)

(72) Inventors: Tae-Hoon Kim, Seoul (KR); Minje Park, Seongnam (KR)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/541,631

(22) Filed: Nov. 14, 2014

(65) Prior Publication Data

US 2016/0140391 A1 May 19, 2016

(51) Int. Cl.

| | |
|---|---|
| *G06K 9/00* | (2006.01) |
| *G06K 9/46* | (2006.01) |
| *G06K 9/62* | (2006.01) |
| *G06T 7/20* | (2017.01) |
| *H04N 7/18* | (2006.01) |
| *G06K 9/32* | (2006.01) |
| *H04N 5/232* | (2006.01) |

(52) U.S. Cl.
CPC ....... *G06K 9/00624* (2013.01); *G06K 9/3241* (2013.01); *G06K 9/46* (2013.01); *G06K 9/6201* (2013.01); *G06T 7/20* (2013.01); *H04N 5/232* (2013.01); *H04N 7/18* (2013.01); *G06K 2009/3291* (2013.01)

(58) Field of Classification Search
None
See application file for complete search history.

(56) References Cited

U.S. PATENT DOCUMENTS

| | | | | |
|---|---|---|---|---|
| 6,411,339 B1* | 6/2002 | Akutsu | ................... | G11B 27/28 |
| | | | | 348/157 |
| 7,106,374 B1* | 9/2006 | Bandera | ............. | H04N 5/23206 |
| | | | | 348/170 |
| 8,098,912 B2* | 1/2012 | Pedrizzetti | ............... | A61B 8/08 |
| | | | | 367/87 |
| 8,170,278 B2* | 5/2012 | Zhao | ................... | G06K 9/00785 |
| | | | | 382/103 |
| 8,811,666 B2* | 8/2014 | Maki | ....................... | G06T 7/277 |
| | | | | 348/169 |
| 2003/0179294 A1* | 9/2003 | Martins | ................... | G01S 3/781 |
| | | | | 348/157 |
| 2004/0258152 A1 | 12/2004 | Herz | | |

(Continued)

FOREIGN PATENT DOCUMENTS

KR    10-20110087623 A    8/2011

OTHER PUBLICATIONS

International Search Report and Written Opinion for International Patent Application No. PCT/US2015/054509, mailed on Feb. 1, 2016.

*Primary Examiner* — Tsung-Yin Tsai
(74) *Attorney, Agent, or Firm* — Green, Howard & Mughal LLP.

(57) ABSTRACT

Techniques related to automatic target object selection from multiple tracked objects for imaging devices are discussed. Such techniques may include generating one or more object selection metrics such as accumulated distances from frame center, accumulated velocities, and trajectory comparisons of predicted to actual trajectories for tracked objects and selecting the target object based on the object selection metric or metrics.

20 Claims, 8 Drawing Sheets

(56) References Cited

U.S. PATENT DOCUMENTS

| | | | |
|---|---|---|---|
| 2009/0244309 A1* | 10/2009 | Maison | G06K 9/00369 348/222.1 |
| 2010/0053358 A1* | 3/2010 | Kodama | G06T 7/248 348/222.1 |
| 2010/0054536 A1* | 3/2010 | Huang | G06K 9/32 382/103 |
| 2010/0156616 A1* | 6/2010 | Aimura | G06T 7/593 340/436 |
| 2010/0157089 A1* | 6/2010 | Pakulski | G06T 7/248 348/222.1 |
| 2011/0241991 A1 | 10/2011 | Ogura et al. | |
| 2012/0087580 A1 | 4/2012 | Woo et al. | |
| 2012/0218427 A1* | 8/2012 | Wu | H04N 5/23267 348/208.6 |
| 2012/0219174 A1* | 8/2012 | Wu | G06T 7/215 382/103 |
| 2012/0237081 A1 | 9/2012 | Datta et al. | |
| 2012/0321128 A1* | 12/2012 | Medioni | G06K 9/00771 382/103 |
| 2014/0079297 A1* | 3/2014 | Tadayon | G06K 9/00 382/118 |
| 2014/0205141 A1 | 7/2014 | Gao et al. | |
| 2015/0290795 A1* | 10/2015 | Oleynik | G05B 19/42 700/257 |

\* cited by examiner

AUTOMATIC TARGET SELECTION FOR MULTI-TARGET OBJECT TRACKING

BACKGROUND

Obtaining images via cameras or cameras integrated within devices such as mobile phones or tablets or the like is very common. In some instances, the imaging device may be equipped with smart object tracking such that high quality images and videos of moving objects may be attained. Some implementations may allow for tracking of a single object while others may allow for tracking multiple objects in real time. In such multiple object tracking implementations, due to various limitations such as physical limitations of the optical devices and/or image processing units, a single object may be selected for 3A (e.g., auto focus, auto exposure and auto white balance) adjustments during capture.

Selection of a target object from the multiple tracked objects may be performed by the user. For example, a user may select a target object from among several objects that are being tracked. The scene including the tracked objects may be displayed to a user via a display and, in some cases, an indicator (e.g., a box around a tracked object) may be displayed that indicates the object is being tracked and may be selected by the user. The user may select from the objects using an input device such as a touch screen that also displays the scene including the objects and optional indicators. As discussed, the selected target object may be tracked for image or video capture.

However, selecting a target object from the multiple tracked objects may be difficult for users, particularly when the objects are fast moving. Furthermore, the user input such as the touch interface may make the camera unsteady, which may negatively affect object tracking and/or image capture by the camera.

As such, existing techniques do not provide for easy and robust selection of a target object from multiple tracked objects. Such problems may become critical as the desire to easily and quickly obtain aesthetically pleasing images in a variety of device implementations becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
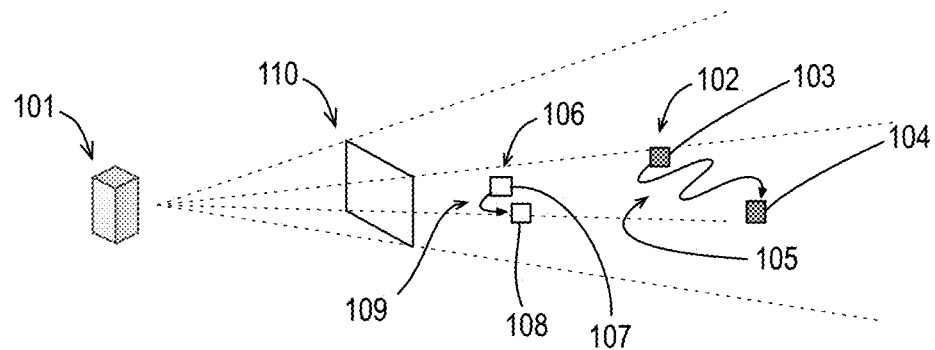
FIG. 1 is an illustrative diagram of an example exposure setting for automatic object selection from multiple tracked objects for an imaging device.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to providing automatic object selection from multiple tracked objects for imaging devices and, in particular, to automatically selecting an object for tracking based on one or more object selection metrics for the tracked objects.

As described above, obtaining images via imaging devices (e.g., cameras or cameras integrated within devices such as smartphones or the like) may be common. In some instances, such imaging devices may track multiple objects and present such objects to a user for selection of a target object. The target object may be tracked and automatic image capture settings and image capture may be performed based on the tracked object. However, selecting a target object from the multiple tracked objects may be difficult for users and user input associated with the selection may make the camera unsteady, negatively affecting object tracking and/or image capture.

Techniques discussed herein may provide for automatic target object selection from multiple tracked objects. Such techniques may automatically estimate a target object, from the multiple moving objects, that a user is or is intending to target or focus on. For example, the multiple moving objects may be tracked simultaneously and, based on movements of the objects and an estimated movement of the camera (e.g., which may indicate the user's intention), a target object may be automatically selected as the that is most relevant based on the movement of the imaging device (e.g., as determined via the trajectories of the tracked object) and the tracked object. The automatically selected target object may be used for various applications such as 3A (e.g., auto focus, auto exposure and auto white balance) adjustments, image capture, video capture, object recognition, or the like.

For example, the techniques discussed herein may select a target object based on an evaluation of the trajectories of the multiple tracked objects. The evaluation may determine which object's movement (e.g., trajectory) is most consistent with that of an object a user is attempting or intending to track or focus on or the like. For example, the user may be moving the imaging device in an attempt to track or focus on the target object. Such user movement of the imaging device may not exactly follow the movement of the object as such objects may be fast moving or moving in unpredictable ways or the like. The described techniques may provide one or more metrics to measure the differences between the movement of the imaging device and the trajectory of the moving objects. For example, the metric(s) may include voting for location convergence, embedding curves of the movements to a low dimensional space and measuring the distance between the curves, measuring the error between the objects movements and a model of the user's movements, or the like.

In some embodiments discussed herein, providing automatic object selection from multiple tracked objects for an imaging device may include tracking multiple (e.g., two or more) objects across multiple (e.g., two or more) image frames. For example, the multiple objects may be detected using any suitable technique or techniques (e.g., saliency based, face based, or image descriptor based object detection or the like) and tracked across the multiple frames to generate multiple object trajectories, each associated with an object of the multiple tracked objects. An object selection metric may be generated for each of the multiple tracked objects. The object selection metric or metrics for each tracked object may include an accumulated distance from frame center, an accumulated velocity, or a trajectory comparison of a predicted trajectory to an actual trajectory for the first object across the two or more image frames, or the like as is discussed further herein. Based on the object selection metric or metrics, a target object may be selected for single object tracking and use for image capture or object recognition or the like. The target object selection may be based on a minimum of the metrics associated with the tracked objects in some examples.

Using such techniques, a target object may be automatically selected for a user from multiple tracked objects. Such techniques may provide for ease of use by the user and improved image capture as the imaging device may not need to be moved during user selection. Furthermore, the user may concentrate on tracking the desired object without the distraction of attempting to make a target object selection.

FIG. 1 is an illustrative diagram of an example exposure setting 100 for automatic object selection from multiple tracked objects for an imaging device 101, arranged in accordance with at least some implementations of the present disclosure. As shown in FIG. 1, exposure setting 100 may include imaging device 101 attaining an image of a moving objects 102 and 106 through an image plane 110 providing a field of view illustrated via dotted lines. Although illustrated with two moving objects 102, 106, exposure setting 100 may include any number of moving objects within the field of view. Imaging device 101 may include any suitable imaging device having an image capture capability. For example, imaging device 101 may be a handheld digital camera, a smartphone, an ultrabook, a laptop, a tablet, a mobile phone or device, or the like.

Figure 2:
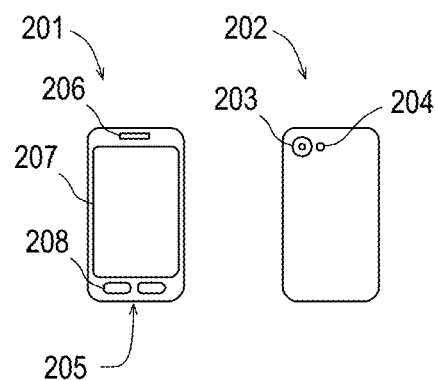
FIG. 2 illustrates an example imaging device.

FIG. 2 illustrates example imaging device 101, arranged in accordance with at least some implementations of the present disclosure. As shown in FIG. 2, in an embodiment, imaging device 101 is a smartphone. As shown, imaging device 101 may include a front 201 and a back 202. In some examples, as shown, the back 202 of imaging device 101 may include an integrated camera 203 (e.g., including a lens, an aperture, and an imaging sensor) and a flash 204 (e.g., a flash or flash light). Also as shown, the front 201 of imaging device 101 may include a speaker 206, a display 207, and one or more buttons 208. Furthermore, imaging device 101 may include a microphone 205, which in the illustrated example is shown on the bottom of imaging device 101.

The described components of imaging device 101 may be incorporated in any suitable manner. For example, camera 203 and flash 204 may be incorporated on the front 201 of imaging device 101. In some examples, both a front and back camera and flash may be incorporated into imaging device 101. Furthermore, in some examples, display 207 may be a touch screen display such that a user may interact with imaging device 101 via commands initiated via display 207. In some examples, microphone 205 may be incorporated on the front 201 or the back 202 of imaging device 101. As discussed, in some examples, imaging device 101 may include each of the described components. In other examples, imaging device 101 may not include one or more of the described components. For example, imaging device 101 may not include speaker 206 and/or microphone 205. Furthermore, the discussed components may incorporated into any form factor device such as the illustrated smartphone, a dedicated camera (e.g., point and shoot camera or interchangeable lens system camera or the like), an ultrabook, a laptop, a tablet, or any other device discussed herein.

Returning to FIG. 1, as shown, object 106 may move along a path or trajectory 109 from position 107 to position 108 and object 102 may move along a path or trajectory 105 from position 103 to position 104. In response to such motion, a user of imaging device 101 may move (e.g., linearly, rotationally, via panning, via tilting, or the like) imagine device 101 in an attempt to track object 106 or object 102. For example, the user of imaging device 101 may track object 102 if object 102 is the object of interest of the user. For example, in a car racing setting, object 102 may be a car the user is attempting to attain an image or video of, in a soccer game setting object 102 may be a player the user is attempting to attain an image of, and so on. As is discussed further herein, the relative motion of objects 106, 102 in an image frame and across multiple image frames may be used to generate object selection metrics, which may be used to select a target object from objects 106, 102 (or more) for use in image capture or object recognition or the like.

Furthermore, in some examples, imaging device 101 may be subject to a motion or shaking (e.g., as the user holds and/or moves imagine device 101 to track one of objects 102, 106) and, furthermore, one or more of objects 102, 106 may also shake or vibrate or the like. Imaging device 101 may include image stabilization circuitry as is discussed further herein with respect to FIG. 3 to reduce the effects of such motion, shaking, or vibration such that trajectories across frames of objects 102, 106 may be generated that are substantially smooth. In some examples, such trajectories may be generated using a dynamic filter such as a Kalman filter or the like. Furthermore, objects 102, 106 may not typically make high frequency movements. Such substantially smooth trajectories and a lack of high frequency movements may allow for robust determinations using the techniques discussed herein.

Figure 3:
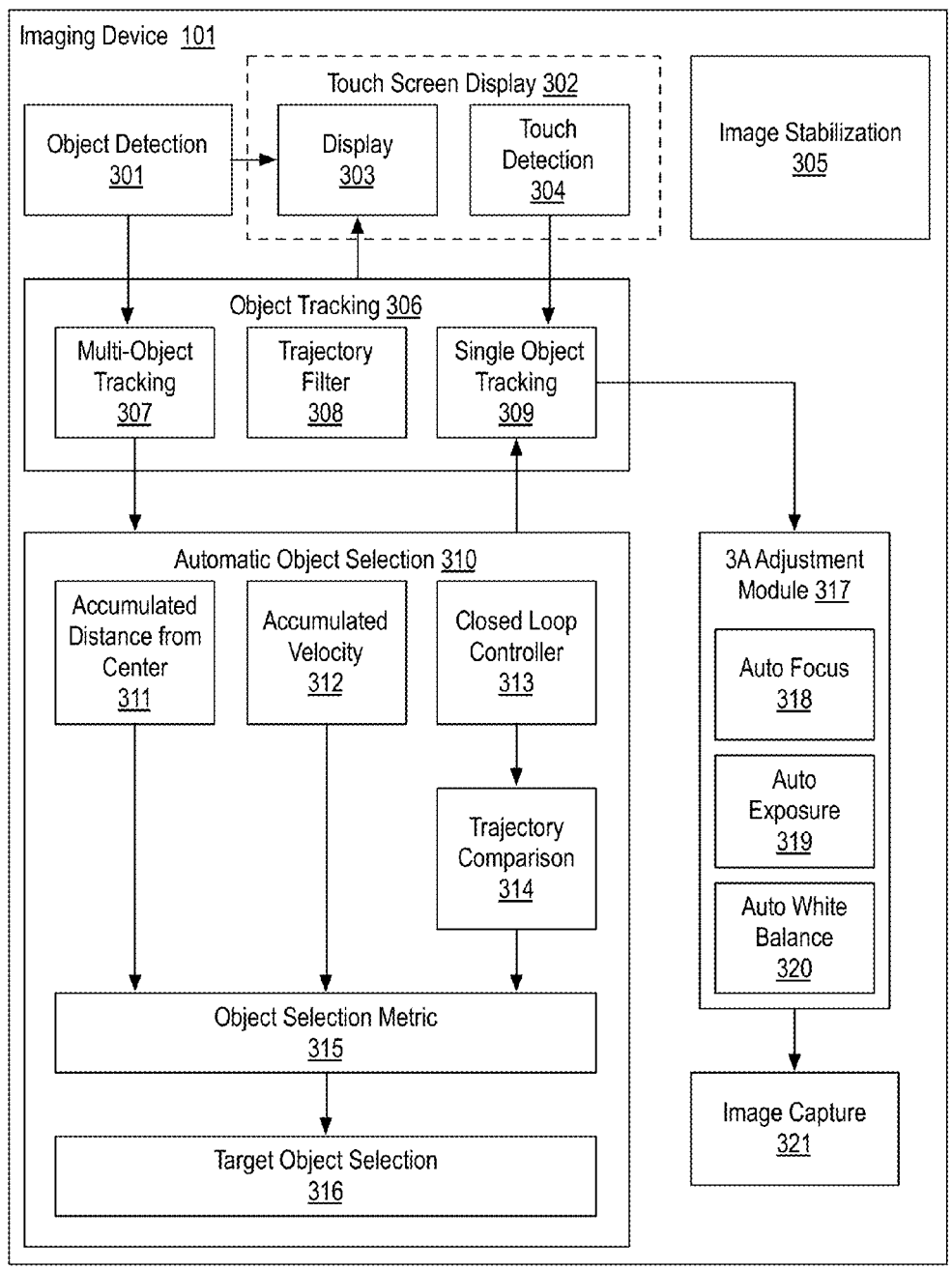
FIG. 3 is an illustrative block diagram of an example imaging device.

FIG. 3 is an illustrative block diagram of example imaging device 101, arranged in accordance with at least some implementations of the present disclosure. As shown in FIG. 3, imaging device 101 may include an object detection module 301, a touch screen display 302, an image stabilization module 305, an object tracking module 306, an automatic object selection module 310, a 3A adjustment module 317, and an image capture module 321. Also as shown, touch screen display 302 may include a display 303 and a touch detection module 304, object tracking module 306 may include a multi-object tracking module 307, a trajectory filter module 308, and a single object tracking module 309, automatic object selection module 310 may include an accumulated distance from center module 311, an accumulated velocity module 312, a closed loop controller 313, a trajectory comparison module 314, an object selection metric module 315, and a target object selection module 316, and 3A adjustment module 317 may include an auto focus module 318, an auto exposure module 319, and an auto white balance module 320.

Image stabilization module 305 of imaging device may provide for stabilization of imaging device 101 using any suitable technique or techniques. For example, image stabilization module 305 may provide one or more of lens based optical image stabilization, sensor based optical image stabilization, digital image stabilization, camera body stabilization, or the like. Such image stabilization may be provided via image stabilization module 305 and any other suitable modules or components of imaging device 101 (e.g., the lens and/or image sensor of camera 203, image processing circuitry, or the like).

Imaging device 101 may attain image frames (not shown) via a camera and/or related circuitry and such image frames may be stored in memory and/or provided to various modules of imaging device 101. As used herein, the term image frame may include any data representing an image and/or the presentment thereof. Such image frames may be captured via image sensors and processed via image processing circuitry, an imaging pipeline, or the like. Touch screen display 302 may receive such image frames and present them to a user via display 303. Furthermore, object detection module 301 may receive one or more image frames and object detection module 301 may detect multiple objects within the one or more image frames. Object detection module 301 may detect such objects using any suitable technique or techniques. For example, object detection module 301 may perform one or more of saliency based object detection, face based object detection, image descriptor based object detection, or the like to detect multiple objects within the image frames. For example, object detection module 301 may detect objects 102, 106 via such object detection techniques. Object detection module 301 may store object detection data (e.g., locations, sizes, types, or the like) associated with such objects to memory and/or provide such data to other modules of imaging device 101.

As shown, touch screen display 302 may receive such object detection data from object detection module 301 or memory and touch screen display 302 may display to a user via display 303 an indication of such objects. For example, the indications of detected objects may comprise boxes around the detected objects or the like. Such boxes may provide one or more regions of interest or potential regions of interest for the user for example. As is discussed further herein, a user may select an object or region of interest (e.g., a target object or target region of interest) for tracking and subsequent 3A adjustments and image capture or the like. For example, such a user selection may be made via touch detection module 304 of touch screen display 302 (e.g., via a user touch) and such a selection may intervene or preempt the automatic object selection processes discussed herein.

In such examples, touch detection module 304 may generate a target object indicator and provide such target object indicator to memory and/or other modules of imaging device 101. The target object indicator may include any suitable data indicating the selected target object such as the target object size, location, characteristics, or the like.

As shown, single object tracking module 309 of object tracking module 306 may receive the target object indicator from memory or touch detection module 304 of touch screen display 302. Single object tracking module 309 may perform object tracking of the target object based on the target object indicator. Such object tracking may be performed using any suitable technique or techniques. As shown, in some examples, object tracking module 306 may implement separate multi-object tracking module 307 and single object tracking module 309. In other examples, multi-object tracking and single object tracking may be implemented via the same module or circuitry or the like. In some examples, multi-object tracking as discussed herein may include multiple instances of single object tracking repeated or performed in parallel for multiple tracked objects. Also as shown, single object tracking module 309 may include trajectory filter module 308. Trajectory filter module 308 may implement a dynamic filter such as a Kalman filter, a linear quadratic estimation filter, or the like to the object trajectories attained via multi-object tracking module 307 and/or single object tracking module 309. Such filtering may smooth the attained object trajectories. Single object tracking module 309 may generate an object trajectory or object location or the like and provide the object trajectory or object location to memory and/or 3A adjustment module 317.

3A adjustment module 317 may receive the object trajectory or object location and 3A adjustment module 317 may provide one or more of auto focus via auto focus module 318, auto exposure via auto exposure module 319, and auto white balance module 320 via auto white balance module 320. Such auto focus, auto exposure, and auto white balance may be provided via any suitable technique or techniques based on information available for the target object or the frame region of the target object or the like. As shown, at completion of such 3A adjustments, an image capture process may be implemented or provided via image capture module 321. For example, image capture module 321 may capture an image frame via a camera (e.g., camera 203) having a lens, an aperture, and an imaging sensor. In some examples, image capture module 321 may capture the image based on the discussed auto focus, auto exposure, and auto white balance or parameters or settings determined using the discussed auto focus, auto exposure, and auto white balance.

As discussed, object detection module 301 may detect multiple objects within one or more image frames using any suitable technique or techniques and object detection module 301 may store object detection data associated with such objects to memory and/or provide such data to other modules of imaging device 101. As shown, multi-object tracking module 307 may receive such object detection data from memory or object detection module 301. Multi-object tracking module 307 may perform object tracking of the multiple objects based on the received object detection data. Such object tracking may be performed using any suitable technique or techniques to generate multiple object trajectories (e.g. one trajectory for each of the multiple objects) across multiple frames. Also, as discussed, single object tracking module 309 may include trajectory filter module 308, which may implement a filter on the object trajectories to smooth the attained object trajectories. Multi-object tracking module 307 may provide the generated object trajectories to memory and/or automatic object selection module 310.

As shown, automatic object selection module 310 may receive object trajectories from memory or multi-object tracking module 307. Automatic object selection module 310 may generate one or more object selection metrics associated with the received trajectories and tracked objects. Such metrics may include, for example, accumulated distances from frame center for the trajectories (e.g., for a tracked object across image frames), an accumulated velocity for the trajectories, a trajectory comparison of predicted trajectories to the (actual) trajectories, a combination thereof, a metric based on such metrics, or the like.

For example, accumulated distance from center module 311 may generate an accumulated distance from center for each trajectory and accumulated velocity module 312 may generate an accumulated velocity for each trajectory. Furthermore, closed loop controller 313 may generate a predicted trajectory for each object assuming each object is the target object, as is discussed further herein, and trajectory comparison module 314 may compare the predicted trajectory to the actual trajectory for each tracked object to generate a trajectory comparison value or the like. As shown, such metrics (e.g., accumulated distances, accumulated velocities, and/or trajectory comparison values) may be transmitted to object selection metric module 315, which may optionally combine such metrics to generate a metric or target selection score or the like for each of the tracked objects. Such metrics or target selection scores or the like may be transmitted to target object selection 316, which may select a target object based on the metrics or target selection scores or the like (e.g., based on a minimum value or the like) and select an object of the tracked objects as a target object.

Automatic object selection module 310 may provide the target object or a target object indicator to memory and/or to single object tracking module 309 of object tracking module 306. Single object tracking module 309 of object tracking module 306 may receive the target object indicator from memory or automatic object selection module 310 (e.g., via target object selection module 316 of automatic object selection module 310) and, as discussed with respect to user object selections, single object tracking module 309 may perform object tracking of the target object based on the target object indicator. As discussed herein, single object tracking module 309 may generate an object trajectory or object location or the like and provide the object trajectory or object location to memory and/or 3A adjustment module 317. Also as discussed, 3A adjustment module 317 may receive the object trajectory or object location and provide one or more of auto focus, auto exposure, and auto white balance and, at completion of such 3A adjustments, an image capture process may be implemented or provided via image capture module 321 as discussed to capture an image based on the automatically selected target object.

Such processing as described with respect to automatic object selection module 310 may generate one or more object selection metrics and select one of the multiple tracked objects as a target object for further processing. Such further processing may include 3A adjustments and image capture, as discussed, object recognition, adjustments and/or video capture, or the like.

Figure 4:
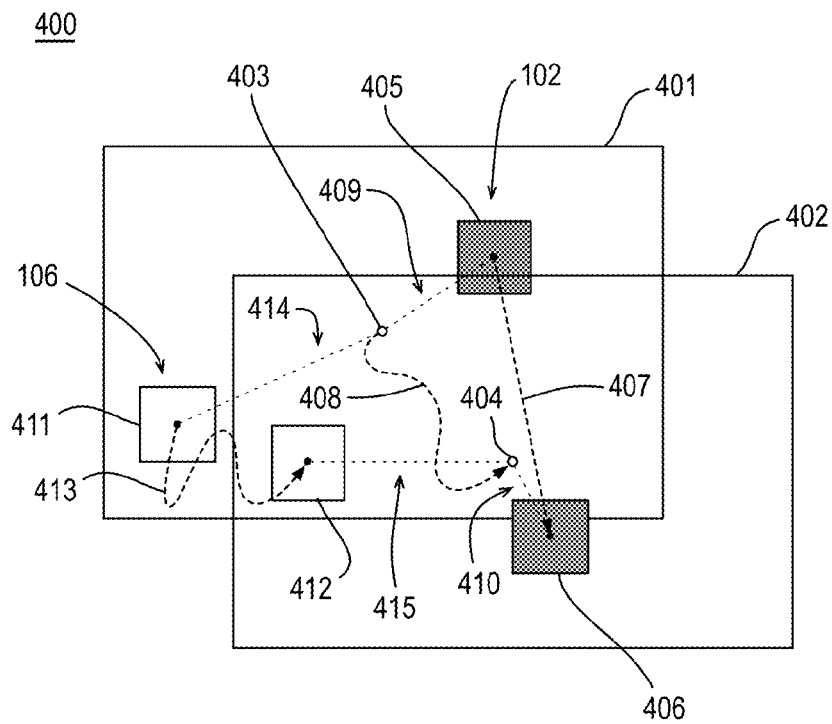
FIG. 4 illustrates example object movements across image frames.

FIG. 4 illustrates example object movements across image frames 400, arranged in accordance with at least some implementations of the present disclosure. As shown in FIG. 4 object 102 may move from a position 405 in an image frame 401 to a position 406 in an image frame 402 and object 106 may move from a position 411 in image frame 401 to a position 412 in image frame 402. Also as shown, image frame 401 may have a frame center 403 and image frame 402 may have a frame center 404. In the illustration of FIG. 4, image frame 401 and image frame 402 are shown offset with respect to one another for the sake of clarity of presentation. For example, image frame 401 may prior to image frame 402 in a sequence of frames. Image frame 401 may be immediately prior to image frame 402 or any number of intervening image frames may be between image frame 401 and image frame 402.

Figure 5:
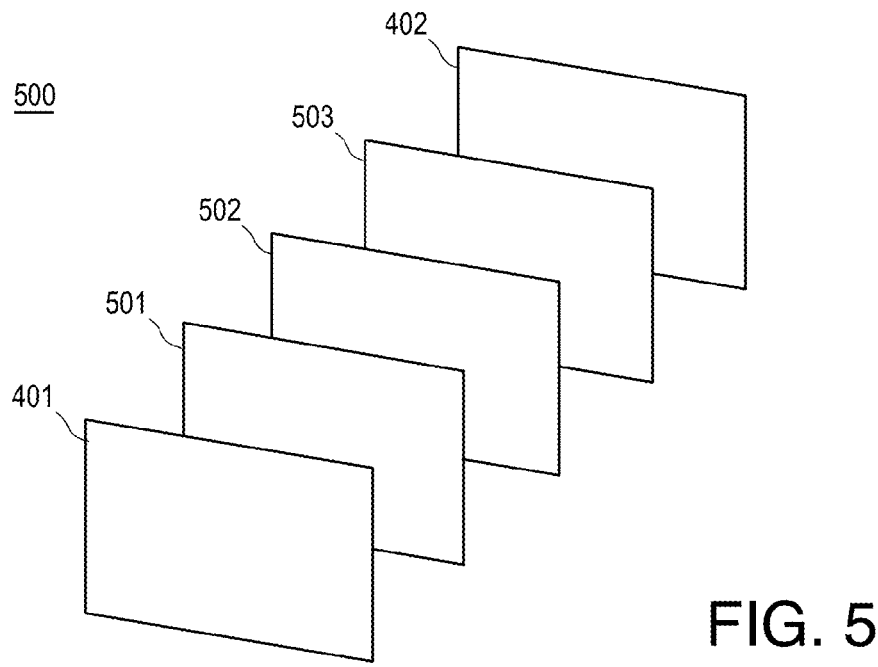
FIG. 5 illustrates example image frames attained by an imaging device.

FIG. 5 illustrates example image frames 500 attained by imaging device 101, arranged in accordance with at least some implementations of the present disclosure. As shown in FIG. 5, image frames 500 may be attained by imaging device 101. Image frames 500 may include any number of image frames 401, 501, 502, 503, and 402, and image frames 500 may be attained by imaging device 101 at times when camera 203 of imaging device 101 is activated, at times when imaging device 101 is active (e.g., even if a camera application is not being run by a user), at times when an exposure sequence has been initiated (e.g., based on a user initiation), or the like. For example, image frames 500 may be attained such that imaging device 101 may provide various functionality including object detection, object tracking, target object selection, 3A adjustments, image capture, video capture, object recognition, presentation to a user, or the like.

For example, image frames 500 may be attained at any frame rate such as a frame rate of 24, 30, 60, 120, 240, or 480 frames per second, a frame rate in the range of 60-120 frames per second, or the like and image frames 500 may be used by imaging device 101 or various components of imaging device 101 via an imaging pipeline or the like. For example, image frames 500 or a subset thereof may be subjected to various processing techniques to generate imaging data for analysis. Such an imaging pipeline may be implemented in hardware of imaging device 101 for example. The processing techniques may include any suitable processing techniques and the resultant data may be available for evaluation or additional processing. The resultant data may include, for example, pixel level resolution data, down-sampled image data, filtered image data, brightness data, color balance data, or the like. The resultant data may be based on individual static images or pairs or groups of images. The resultant data sets from such processing may be at any resolution. For example, the resolution may be the same as the resolution of camera 203 (e.g., 8 megapixels or the like) or at a reduced resolution. Furthermore, the resultant data sets and/or image frames 401, 501, 502, 503, 402 may be utilized for the image processing techniques discussed herein.

In the examples illustrated by FIGS. 4 and 5, three image frames 501, 502, 503 may be between image frames 401, 402 to generate the discussed trajectories. However, any number of frames may be between image frames 401, 402. Furthermore, all image frames or only some frames may be evaluated to generate the discussed trajectories and/or metrics. For example, every frame may be evaluated (e.g., the evaluation may be on a frame-by-frame basis), every other frame may be evaluated, every third frame may be evaluated, every Nth frame may be evaluated, and so on. Such evaluation patterns may be consistent or they may be varied on the fly. The evaluation pattern may depend on the capability of the processing of imaging device 101, power management policies, remaining battery life, or the like. Further, the evaluation pattern may depend speed of the objects being tracked such that faster motion may be evaluated more frequently and slower motion may be evaluated less frequently.

Returning to FIG. 4, in the illustrated example, a user of imaging device 101 (please refer to FIG. 1) may be interested in attaining an image of object 102. Furthermore, imaging device 101 may be tracking multiple objects including object 102 and object 106. As discussed, imaging device 101 may be moved by the user 101 as the user attempts (e.g., with varying degrees of success) to attain an image of object 102. For example, the user may move imaging device 101 to cause a trajectory 408 of the image frame center. Such user movements may attempt to center and track object 102 and such user movements may be made without regard to the location and tracking of object 106, for example.

For example, object 102 at position 405 in frame 401 may be a distance 409 from frame center 403 of frame 401 and object 106 at position 411 in frame 401 may be a distance 414 from frame center 403 of frame 401. Also as shown, object 102 at position 406 in frame 402 may be a distance 410 from frame center 404 of frame 402 and object 106 at position 412 in frame 402 may be a distance 415 from frame center 404 of frame 402. In the examples, discussed herein, the object distances from frame center, velocities, and the like may be based on the centers of objects 102, 106, however, any suitable position of objects 102, 106 may be used.

As shown, distance 409 may be less than distance 414 and distance 410 may be distance 415, indicating object 102 may be the user's object of interest as the user will typically want to keep an object of interest at or near a center of the frame. In the illustrated example, two image frames 401, 402 and two distances from frame center are shown for each of objects 102, 106, however any number of image frames and associated distances may be evaluated and accumulated. For example, distances to frame center may be determined for intervening image frames 501-503 and/or for additional image frames may evaluated and accumulated.

For example, accumulated distance from center module 311 may accumulate distances from center for objects across multiple frames. In the example, an accumulated distance for object 102 may include distance 409 and distance 410 and an accumulated distance for object 106 may include distance 414 and distance 415. Such accumulated distances from center for objects may be accumulated over any number of frames such as 10, 15 frames, scores of frames, or more, with more frames being advantageous. In examples where only accumulated distances from center are used as the object selection metric, a minimum accumulated distances from center may indicate the target object. For example, target object selection module 316 may receive the accumulated distances from center for the multiple tracked objects and select a target object based on a minimum of the received accumulated distances from center. In such examples, object selection metric 315 may not be implemented.

Continuing with FIG. 4, as shown, object 102 may traverse a trajectory 407 from position 405 within frame 401 to position 406 within frame 402 and object 106 may traverse a trajectory 413 from position 411 within frame 401 to position 412 within frame 402. In the illustrated example, the determined trajectories 407, 413 may be determined based on frames 401, 402 and several intervening frames such as image frames 501, 502, 503. As shown, trajectory 407 may be relatively stable and robust while trajectory 413 may move substantially between instances of times (e.g., frames), indicating object 102 may be the user's object of interest as the user will typically want to keep an object of interest relatively still within the frame.

Figure 6:
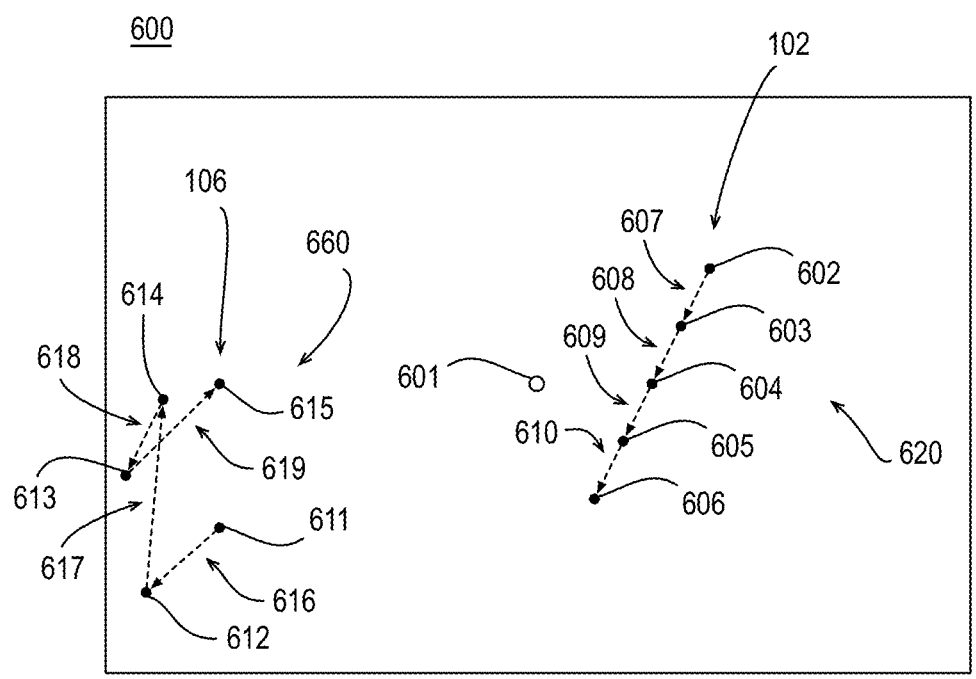
FIG. 6 is a diagram of an example image frame overlay illustrating example object movement.

FIG. 6 is a diagram of an example image frame overlay 600 illustrating example object movement, arranged in accordance with at least some implementations of the present disclosure. In the illustration of FIG. 6, sample frames are overlaid for the sake of clarity of presentation. In the illustrated example, overlay 600 may include five frames, however, any number of frames may be used as discussed herein. As shown, overlay 600 may include a frame center 601 of the overlaid image frames.

As shown in FIG. 6, object 102 may traverse a trajectory 620 through positions 602-606. For example, position 602 may correspond to a position within frame 401, position 603 may correspond to a position within image frame 501, position 604 may correspond to a position within image frame 502, position 605 may correspond to a position within image frame 503, and position 606 may correspond to a position within image frame 402. As shown, trajectory 620 may be relatively robust and, although trajectory 620 provides movement between image frames (e.g., from position 602 to position 606), the movement is relatively smooth.

Also as shown in FIG. 6, object 106 may traverse a trajectory 660 through positions 611-615. For example, position 611 may correspond to a position within frame 401, position 612 may correspond to a position within image frame 501, position 613 may correspond to a position within image frame 502, position 614 may correspond to a position within image frame 503, and position 615 may correspond to a position within image frame 402. As shown, trajectory 660 may be provide for a substantial amount of non-linear movement.

With reference to FIG. 3, accumulated velocity module 312 may accumulate velocities across multiple frames for objects 102, 106. For example, for object 102, accumulated velocity module 312 may determine and accumulate velocities based on changes in position 607-610 and the applicable frame rate or sampling rate or the like. For example, change in position 607 over the time change associated with change in position 607 may correspond to a speed or velocity of object 102 between positions 602, 603. Similarly, changes in position 608, 609, 610 over the time change associated with the changes in positions 608, 609, 610 may correspond to a speed or velocity of object 102 as it traverses trajectory 620. Similarly, for object 106, accumulated velocity module 312 may determine and accumulate velocities based on changes in position 616, 617, 618, 619 and the applicable frame rate or sampling rate or the like. For example, change in position 616 over the time change associated with change in position 616 may correspond to a speed or velocity of object 106 between positions 611, 612 and changes in position 617, 618, 619 over the time change associated with the changes in positions 617, 618, 619 may correspond to a speed or velocity of object 106 as it traverses trajectory 660.

Such accumulated velocities may be accumulated via accumulated velocity module 312 over any number of frames such as 10 to 15 frames or more, with more frames being advantageous. In examples where only accumulated velocities are used as the object selection metric, a minimum accumulated velocity may indicate the target object. For example, target object selection module 316 may receive the accumulated velocities for the multiple tracked objects and select a target object based on a minimum of the received accumulated velocities. In such examples, object selection metric 315 may not be implemented.

As discussed, accumulated velocities may be used to determine a target object. Such velocities may typically be absolute value velocities or speeds for example. Furthermore, in the example of FIG. 5, velocities may be determined in a 2-dimensional image coordinate system using linear changes in position 607-610 and 616-618. However, any suitable coordinate plane, space, or system and trajectories may be used. For example, trajectories 620, 660 may be estimated in a 3-dimensional space or a 2-dimensional space using lines or linear approximation between positions 602-606 and 611-615 or trajectories 620, 660 may be estimated using curved approximations (e.g., quadratic or higher order approximations or trigonometric function approximations or the like).

As discussed, accumulated distances from center (e.g., generated via accumulated distance from center module 311) may be used as a metric to determine a target object from multiple tracked objects. Furthermore, accumulated velocities may be used as a metric to determine a target object from multiple tracked objects. In some examples, such accumulated distances from center and accumulated velocities may be combined to generate a metric for determining the target object. For example, an object selection metric may include a weighted sum of an accumulated distance from frame center and an accumulated velocity. For example, an object selection metric may be determined as shown in Equation (1):

$$E = w_1 E_c + w_2 E_v \quad (1)$$

where E may be the object selection metric, $w_1$ may be a first weight, $E_c$ may be an accumulated distance from frame center for an object across frames, $w_2$ may be a second weight, and $E_v$ may be accumulated velocities for an object across frames. The first weight and the second weight may be any suitable values. In some examples, they may sum to one. In some examples, the first weight and the second weight may be preset or predetermined values and, in other examples, they may vary based on object characteristics (e.g., characteristics of the objects being tracked), motion characteristics (e.g., the velocity or trajectory shapes of objects being tracked), or the like. In an example, the first weight may be greater than the second weight when movement is slow (e.g., an average or mean velocity of objects in motion is less than a threshold) and the second weight may be greater than the first weight when movement is fast (e.g., an average or mean velocity of objects in motion is greater than the threshold).

With reference to FIG. 3, the object selection metric, E, including a weighted sum of an accumulated distance from frame center and an accumulated velocity may be determined by object selection metric module 315 for the tracked objects (e.g., an object selection metric may be determined for each tracked object). For example, object selection metric module 315 may receive accumulated distances from accumulated distance from center module 311 and accumulated velocities from accumulated velocity module 312, and object selection metric module 315 may generate the object selection metric by implementing Equation (1). Object selection metric module 315 may provide the object selection metrics to target object selection module 316, which may select a target object for tracking based on the received object selection metrics. For example, target object selection module 316 may select an object as the target object based on the object having a minimum associated object selection metric (e.g., indicating a user is keeping or attempting to keep the target object near a center of the frame and robustly tracked).

Although discussed with respect to a weighted sum, the accumulated distances from frame center and accumulated velocities may be combined in any suitable manner to generate an object selection metric. For example, they may be multiplied, summed or averaged without weighting, or provided to any suitable functions for the generation of the object selection metric. Furthermore, although discussed with respect to determining a minimum object selection metric, target object selection module 316 may evaluate the object selection metrics in any suitable manner such as determining a maximum, comparing to thresholds, comparing to a target value, or the like. For example, an object may be selected as a target based on the closest object selection metric to a target or an object selection metric being between thresholds or the like.

As discussed, accumulated distances from center, accumulated velocities, and/or a combination thereof may be used as a metrics to determine a target object from multiple tracked objects. Such metric(s) may provide ease of implementation and robust target object selection. However, in some environments, a user may not be able to meet such criteria (e.g., a user may not be able to keep an object centered and on a robust trajectory) due to the trajectory of an object being unpredictable (e.g., a soccer player or a bird in flight). In such environments, the user may respond in a manner similar to a feedback system provided with the given (e.g., the user's target object) object's current position and velocity. For example, in control systems, overshoot, damping, and delay may be observable characteristics in a feedback control system and such information may be utilized in generating object selection metrics.

For example, continuing with reference to FIG. 3, imaging device 101 may include a closed loop controller 313. Closed loop controller may receive object trajectories for multiple objects being tracked via multi-object tracking module 307. Based on the received trajectories including, for example, object positions and velocities or the like, closed loop controller 313 may generate a simulated or predicted trajectory such as a close-loop predicted trajectory for each of the tracked objects. Such a predicted trajectory may be generated using any suitable technique or techniques. In some examples, closed loop controller 313 may include a machine learning implementation, which may include a learned model based on the movements of a user of imaging device 101. For example, weights or the like of a machine learning structure may be varied as the movements of the user are learned over time. Closed loop control 313 may implement any suitable controller such as a linear controller, a nonlinear controller, or the like. As shown, closed loop controller 313 may provide the predicted trajectory to trajectory comparison module 314.

Trajectory comparison module 314 may compare the received predicted trajectories for the tracked objects with the actual trajectories of the tracked objects to generate a trajectory comparison metric. As used herein, the term actual trajectory may include a trajectory captured and/or estimated via imaging device 101. In some examples, the actual trajectory may be smoothed via filtering or otherwise approximated via imaging device 101 (e.g., via object tracking module 306). The trajectory comparison metric may be generated using any suitable technique or techniques. In some examples, the trajectory comparison may be a difference or accumulated difference between the predicted trajectory and the actual trajectory. For example, the trajectory comparison may be a accumulated position differences across image frames. In other examples, the trajectory comparison may be a dynamic time warping comparison of the predicted trajectory and the actual trajectory. In examples where only trajectory comparisons are used as the object selection metric, a minimum difference or maximum similarity of the trajectory comparisons may indicate the target object. For example, target object selection module 316 may receive the trajectory comparisons for the multiple tracked objects and select a target object based on a minimum of the trajectory comparisons. In such examples, object selection metric 315 may not be implemented.

As discussed, accumulated distances from center, accumulated velocities, and/or trajectory comparisons may be used as a metric or metrics to determine a target object from multiple tracked objects. In some examples, such accumulated distances from center, accumulated velocities, and trajectory comparison may be combined to generate a metric for determining the target object. For example, an object selection metric may include a weighted sum of an accumulated distance from frame center, an accumulated velocity, and a trajectory comparison. For example, an object selection metric may be determined as shown in Equation (2):

$$E = w_1 E_c + w_2 E_v + w_3 E_f \qquad (2)$$

where E may be the object selection metric, $w_1$ may be a first weight, $E_c$ may be an accumulated distances from frame center for an object across frames, $w_2$ may be a second weight, $E_v$ may be accumulated velocities for an object across frames, and $w_3$ may be a third weight, $E_f$ may be a trajectory comparison for an object across frames. The first weight, second weight, and third weights may be any suitable values. In some examples, they may sum to one. In some examples, the first weight, second weight, and third weights may be preset or predetermined values and, in other examples, they may vary based on object characteristics, motion characteristics, or the like.

With reference to FIG. 3, the object selection metric, E, including a weighted sum of an accumulated distance from frame center, an accumulated velocity, and a trajectory comparison may be determined by object selection metric module 315 for the tracked objects (e.g., an object selection metric may be determined for each tracked object). For example, object selection metric module 315 may receive accumulated distances from accumulated distance from center module 311, accumulated velocities from accumulated velocity module 312, and trajectory comparisons from trajectory comparison module 314. Object selection metric module 315 may generate the object selection metric by implementing Equation (2) and object selection metric module 315 may provide the object selection metrics to target object selection module 316, which may select a target object for tracking based on the received object selection metrics. For example, target object selection module 316 may select an object as the target object based on the object having a minimum associated object selection metric (e.g., indicating a user is keeping or attempting to keep the target object near a center of the frame and robustly tracked).

Although discussed with respect to a weighted sum, the accumulated distances from frame center, accumulated velocities, and trajectory comparisons may be combined in any suitable manner to generate an object selection metric. For example, they may be multiplied, averaged without weighting, or provided to any suitable functions for the generation of the object selection metric. Furthermore, although discussed with respect to determining a minimum object selection metric, target object selection module 316 may evaluate the object selection metrics in any suitable manner such as determining a maximum, comparing to thresholds, comparing to a target value, or the like. For example, an object may be selected as a target based on the closest object selection metric to a target or an object selection metric being between thresholds or the like.

As discussed, accumulated distances from center, accumulated velocities, and/or trajectory comparisons may be used individually or together to determine a target object from multiple tracked objects. Such metrics may be combined in any suitable manner. As discussed with respect to Equations (1) and (2), accumulated distances from center and accumulated velocities and/or accumulated distances from center, accumulated velocities, and trajectory comparisons may be combined via weighted averaging. In other examples, accumulated distances from center and trajectory comparisons may be combined via weighted averaging or any other technique as discussed herein. In yet other examples, accumulated velocities and trajectory comparisons may be combined via weighted averaging or any other technique as discussed herein. Furthermore, as discussed a single metric (e.g., accumulated distances from center, accumulated velocities, trajectory comparisons, or a single combination thereof). In other examples, two or more of such metrics may be used to determine the target object. Such metrics may be combined such that a target object is determined if both are the minimum for an object, based on a ranking of such metrics (to break ties or similarities within a threshold or the like), or the like. Furthermore, additional or other metrics may be used such as a metric associated with the object types, object quality, or the like. Such additional metrics may be combined with the discussed metrics via weighted averaging, voting systems, or the like.

The techniques discussed herein may automatically identify a target object from multiple tracked objects, providing ease of use by the user and improved image capture as the imaging device may not need to be moved during user selection.

Figure 7:
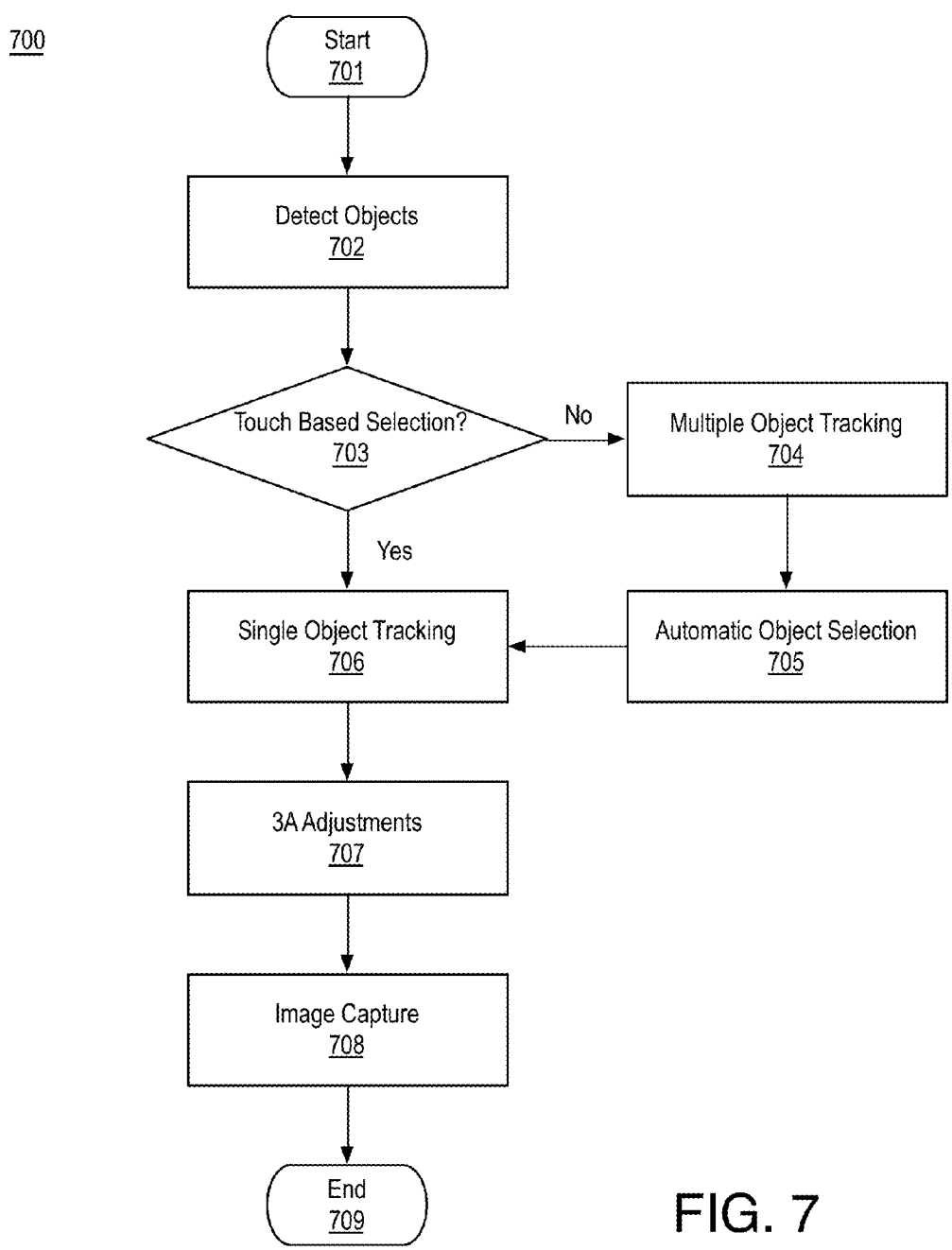
FIG. 7 illustrates an example process for providing automatic object selection from multiple tracked objects.

FIG. 7 illustrates an example process 700 for providing automatic object selection from multiple tracked objects, arranged in accordance with at least some implementations of the present disclosure. Process 700 may include one or more operations 701-709 as illustrated in FIG. 7. Process 700 may be performed by a device or system (e.g., devices 101 or 1100 or systems 900 or 1000), logic circuitry, or the like. Process 700 may be used to automatically select detected and tracked objects for single object tracking, 3A adjustments, and image capture. Furthermore, process 700 may allow a user to select a detected object for single object tracking, 3A adjustments, and image capture and/or for the user to intervene in automatic object selection to make such a selection.

As shown, process 700 may begin from start operation 701 at operation 702, "Detect Objects", where multiple objects may be detected. For example, object detection module 301 may detect objects using any suitable technique or techniques such as saliency based object detection, face based object detection, image descriptor based object detection, or the like. Such object detection may generate any suitable object data associated with the detected objects such as object position, type, size, or the like. In some examples, indications of the detected objects may be provided to a user via boxes around the detected objects presented to the user via display 303 for example.

Process 700 may continue at decision operation 703, "Touch Based Selection?", where a determination may be made as to whether a user has made an object selection. For example, the user may make a touch based object selection via touch screen display 302 by touching touch screen display 302 in an area or region within a box associated with an object presented to the user as discussed with respect to operation 702.

If no touch based selection is made, process 700 may continue at operation 704, "Multiple Object Tracking", where the multiple objects detected at operation 702 may be tracked. For example, the multiple objects may include two or more objects that may be tracked via multi-object tracking module 307 of object tracking module 306. Such object tracking may be performed using any suitable technique or technique and may generate trajectories across frames for the tracked objects. Any frequency of frames may be evaluated during such object tracking such as every frame, every other frame, every third frame, or every Nth frame. In some examples such an evaluation pattern may be consistent and in other examples, it may vary over time (e.g., with more samples being taken when objects are fast moving). Furthermore, such multiple object tracking may include generating a filtered trajectory of the tracked objects as discussed with respect to trajectory filter module 308.

Process 700 may continue from operation 704 at operation 705, "Automatic Object Selection", where a target object may be selected from among the objects tracked at operation 704. For example, for each or at least some of the multiple tracked objects, object selection metrics may be generated. The object selection metrics may include one or more of an accumulated distance from frame center across image frames, an accumulated velocity across image frames, a trajectory comparison of a predicted trajectory to an actual trajectory across image frames, or a combination thereof. The object selection metrics may be evaluated to generate a target object. For example, target object selection module 316 of automatic object selection module 310 may select the target object.

As discussed, at decision operation 703, a determination may be made as to whether a user has made an object selection. Although illustrated as occurring before operations 704, 706, decision operation 703 may be monitored substantially continuously such that if a user selection is made, multiple object tracking and automatic object selection may be halted and single object tracking may begin.

For example, if a touch based selection is made, process 700 may continue at operation 706, "Single Object Tracking". Furthermore, as shown, process 700 may continue from operation 705 at operation 706. At operation 706, single object tracking of the target object may be performed. For example, single object tracking module 309 of object tracking module 306 may track the target object using any suitable technique or techniques. Such object tracking may be performed using any suitable technique or technique and may generate trajectories across frames for the tracked objects. Any frequency of frames may be evaluated during such object tracking such as every frame, every other frame, every third frame, or every Nth frame. In some examples such an evaluation pattern may be consistent and in other examples, it may vary over time (e.g., with more samples being taken when objects are fast moving). Furthermore, such single object tracking may include generating a filtered trajectory of the object as discussed with respect to trajectory filter module 308.

Process 700 may continue at operation 707, "3A Adjustments", where one or more of an auto focus adjustment, an auto exposure adjustment, or an auto white balance adjustment may be performed based at least in part on the target object determined via decision operation 703 or operation 705 and tracked via operation 706. For example, such 3A adjustments may be performed via 3A adjustment module 317. In some examples, 3A adjustments may be made substantially continuously or at regular intervals as the target object is tracked. In other examples, 3A adjustments may be made after user initiated image capture or video capture operation or the like.

Process 700 may continue at operation 708, 'Image Capture", where an image may be captured based on the auto focus adjustment, auto exposure adjustment, and/or auto white balance adjustment. Such image capture may be directed via image capture module 321 and may be performed via a camera, such as camera 203, and related circuitry. As discussed, in some examples, such an image capture operation may be initiated by a user and, in other examples, such an image capture operation may be performed automatically at certain time intervals.

As discussed, based a target object determined via decision operation 703 or operation 705, single object tracking, 3A adjustments, and image capture may be performed. In other examples, video capture may be performed based on the target object. Such video capture may capture multiple frames with one or more of the discussed 3A adjustments being performed based on the target object. In yet other examples, object recognition may be performed based on the target object. In such examples, imaging device 101 may include an object recognition module or circuitry or the like to receive the target object selection and perform object recognition.

Figure 8:
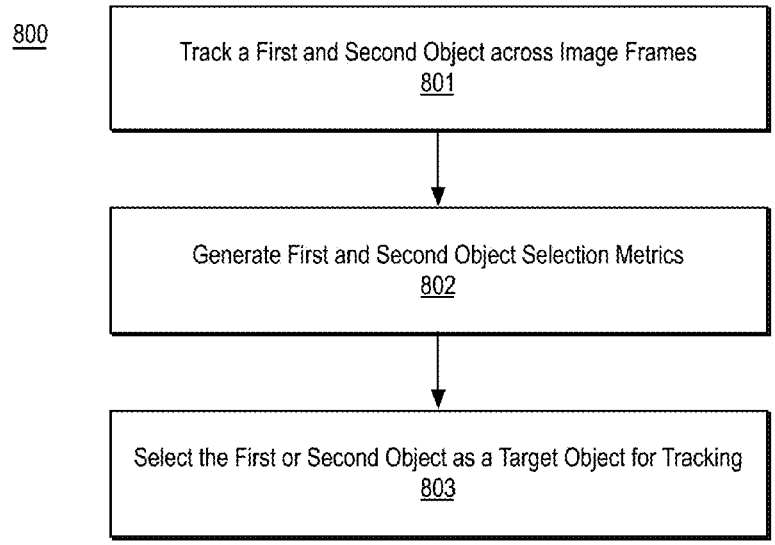
FIG. 8 is a flow diagram illustrating an example process for providing automatic object selection from multiple tracked objects.

FIG. 8 is a flow diagram illustrating an example process 800 for providing automatic object selection from multiple tracked objects, arranged in accordance with at least some implementations of the present disclosure. Process 800 may include one or more operations 801-803 as illustrated in FIG. 8. Process 800 may form at least part of an object selection process. By way of non-limiting example, process 800 may form at least part of an automatic object selection process for imaging device 101 as discussed herein. Furthermore, process 800 will be described herein with reference to system 900 of FIG. 9.

Figure 9:
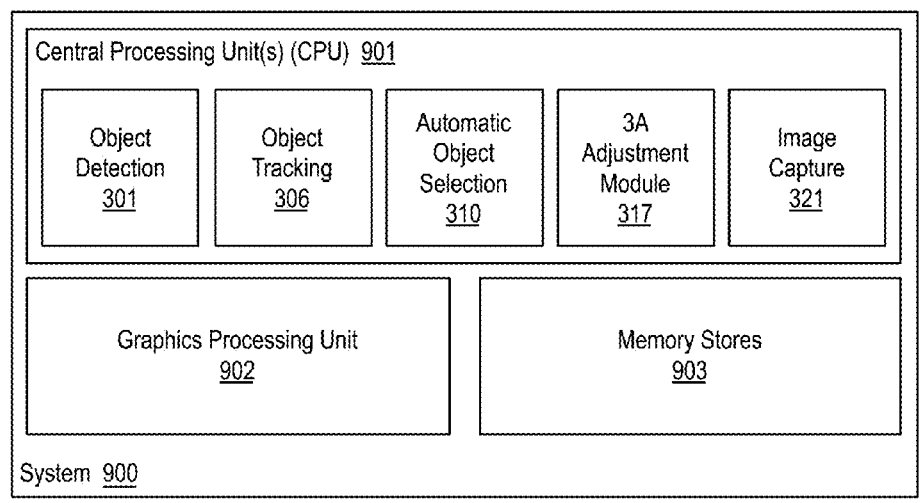
FIG. 9 is an illustrative diagram of an example system for providing automatic object selection from multiple tracked objects.

FIG. 9 is an illustrative diagram of an example system 900 for providing automatic object selection from multiple tracked objects, arranged in accordance with at least some implementations of the present disclosure. As shown in FIG. 9, system 900 may include one or more central processing units (CPU) 901, a graphics processing unit (GPU) 902, and memory stores 903. Also as shown, CPU 901 may include object detection module 301, object tracking module 306, automatic object selection module 310, 3A adjustment module 317, and image capture module 321. As discussed herein, object tracking module 306 may include multi-object tracking module 307, trajectory filter module 308, and single object tracking module 309 and 3A adjustment module 317 may include auto focus module 318, auto exposure module 319, and auto white balance module 320. Furthermore, automatic object selection module 310 may include one or more of accumulated distance from center module 311, accumulated velocity module 312, and closed loop controller 313 and trajectory comparison module 314. Automatic object selection module 310 may also include target object selection module and, optionally, object selection metric module 315. In the example of system 900, memory stores 903 may store image data such as captured images (or image frames), object detection data, object trajectories, predicted trajectories, actual trajectories, object positions, object velocities, display data, 3A adjustment data, target object data, object selection metrics, accumulated distances from center, accumulated velocities, trajectory comparisons, combined object metrics, image related data such as image data generated via an imaging pipeline and/or any other data as discussed herein.

As shown, in some examples, object detection module 301, object tracking module 306, automatic object selection module 310, 3A adjustment module 317, and image capture module 321 may be implemented via central processing units 901. In other examples, one or more of object detection module 301, object tracking module 306, automatic object selection module 310, 3A adjustment module 317, and image capture module 321 may be implemented via graphics processing unit 902. In yet other examples, one or more of object detection module 301, object tracking module 306, automatic object selection module 310, 3A adjustment module 317, and image capture module 321 may be implemented via an imaging pipeline and/or an imaging processing unit. Furthermore, system 900 may include touch screen display 302 and/or image stabilization module 305 as discussed herein with respect to FIG. 3 implemented, in part, via central processing units 901 and/or graphics processing units 902.

Graphics processing unit 902 may include any number and type of graphics processing units that may provide the operations as discussed herein. Such operations may be implemented via software or hardware or a combination thereof. For example, graphics processing unit 902 may include circuitry dedicated to manipulate images obtained from memory stores 903. Central processing units 901 may include any number and type of processing units or modules that may provide control and other high level functions for system 900 and/or provide any operations as discussed herein. Memory stores 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 903 may be implemented by cache memory. In an embodiment, one or more of object detection module 301, object tracking module 306, automatic object selection module 310, 3A adjustment module 317, and image capture module 321 (or other modules discussed herein) may be implemented via an execution unit (EU) of graphics processing unit 902. The EU may include, for example, programmable logic or circuitry such as a logic core or cores that may provide a wide array of programmable logic functions. In an embodiment, one or more of object detection module 301, object tracking module 306, automatic object selection module 310, 3A adjustment module 317, and image capture module 321 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, "Track a First and Second Object across Image Frames", where at least a first object and a second object may be tracked across two or more image frames. For example, object tracking module 306 as implemented via central processing unit 901 may track a first and second object across two or more image frames. As discussed, multiple objects (e.g., two or more objects) may be tracked over any number of frames (e.g., 10 to 15 or more frames) at any frequency of frames (e.g., every frame, every other frame, every third frame, or every Nth frame). Tracking the multiple objects may include generating a filtered trajectory of the objects as discussed with respect to trajectory filter module 308. For example, object tracking module 301 as implemented via central processing unit 901 may generate a filtered trajectory.

In some examples, prior to operation 801, multiple objects (e.g., including the first and second objects) may have been detected. For example, the first object, the second object, and/or any number of additional objects (e.g., multiple objects) may be detected by object detection module 301 as implemented via central processing unit 901 prior to operation 801. The object detection may include one or more of saliency based object detection, face based object detection, and/or image descriptor based object detection.

Processing may continue at operation 802, "Generate First and Second Object Selection Metrics", where a first object selection metric associated with the first object and a second object selection metric associated with the second object may be generated. For example, the first object selection metric associated with the first object and the second object selection metric associated with the second object may be generated by automatic object selection module 310 as implemented via central processing unit 901. The first and second object selection metrics may include any object selection metrics as discussed herein. For example, the first object selection metric may include an accumulated distance from frame center for the first object across the two or more image frames, an accumulated velocity for the first object across the two or more image frames, a trajectory comparison of a predicted trajectory to an actual trajectory for the first object across the two or more image frames, a weighted sum of an accumulated distance from frame center for the first object across the two or more image frames and an accumulated velocity for the first object across the two or more image frames, a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames. In some examples, the first object selection metric may include a trajectory comparison of a predicted trajectory to an actual trajectory for the first object across the two or more image frames. The predicted trajectory may include a closed-loop control predicted trajectory and the trajectory comparison may include a difference between the predicted trajectory and the actual trajectory or a dynamic time warping comparison of the predicted trajectory and the actual trajectory. In some examples, the first object selection metric may include a trajectory comparison of a predicted object trajectory and an actual object trajectory for the first object.

Processing may continue at operation 803, "Select the First or Second Object as a Target Object for Tracking", where the first object or the second object may be selected as a target object for tracking based on the first and second object selection metrics. For example, the first object or the second object may be selected by automatic object selection module 310 as implemented via central processing unit 901. The first or second object may be selected using any suitable technique or techniques based on the object selection metrics generated at operation 802 such as a minimum of the object selection metrics, a maximum of the object selection metrics, or a closest match of the object selection metrics to a predetermined target.

Subsequent to operation 803, single object tracking, 3A adjustments and image capture may be performed based on the selected target object. For example, single object tracking of the target object may be performed, at least one of an auto focus adjustment, an auto exposure adjustment, or an auto white balance adjustment may be provided based at least in part on the target object, and an image may be captured based on the auto focus adjustment, auto exposure adjustment, or auto white balance adjustment. For example, object tracking module 306 as implemented via central processing unit 901 may perform single object tracking of the target object. Furthermore, an image capture adjustment module or circuitry such as 3A adjustment module 317 as implemented via central processing unit 901 may provide at least one of an auto focus adjustment, an auto exposure adjustment, or an auto white balance adjustment and image capture module 321 as implemented via central processing unit 901 may capture an image based on the auto focus adjustment, auto exposure adjustment, or auto white balance adjustment.

As discussed, in some examples, object tracking, 3A adjustments, and image capture may be performed based on the selection of the first object or the second object. In other examples, video capture may be performed based on the selection of the first object or the second object. In yet other examples, object recognition may be performed based on the selection of the first object or the second object.

Process 800 may be repeated any number of times for any number of automatic object sections for a user of imaging device 101. As discussed process 800 may provide for automatic selection of a target object from multiple tracked objects without user intervention such that the discussed process provides ease of use during operation. For example, a user does not have to manually select an object to capture an image, capture video, or perform object recognition as discussed herein.

Various components of the systems described herein may be implemented in software, firmware, and/or hardware and/or any combination thereof. For example, various components of imaging device 101, device 1100, or systems 900 or 1000 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device 101, device 1100, or systems 900 or 1000, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
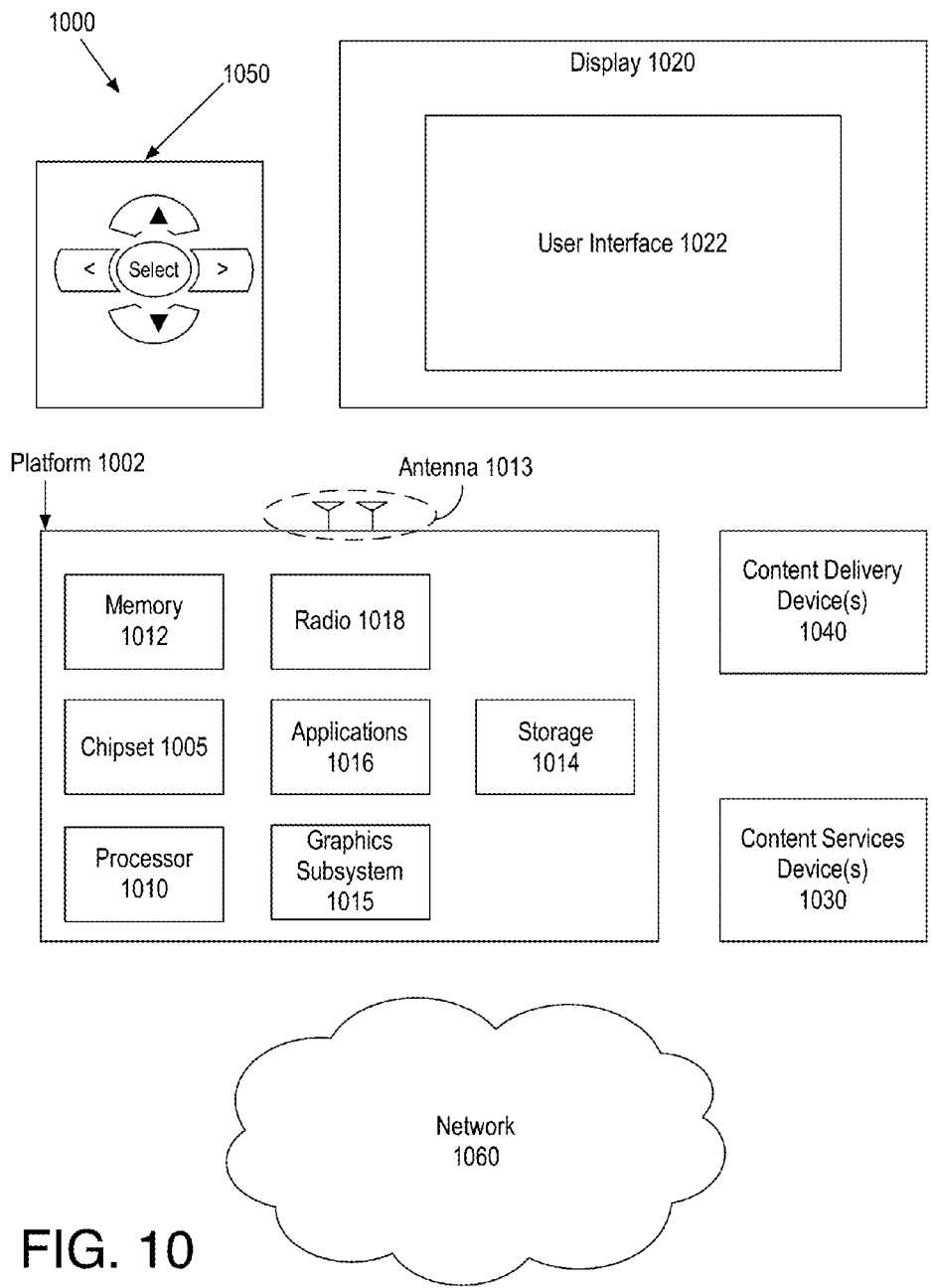
FIG. 10 is an illustrative diagram of an example system.

FIG. 10 is an illustrative diagram of an example system 1000, arranged in accordance with at least some implementations of the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
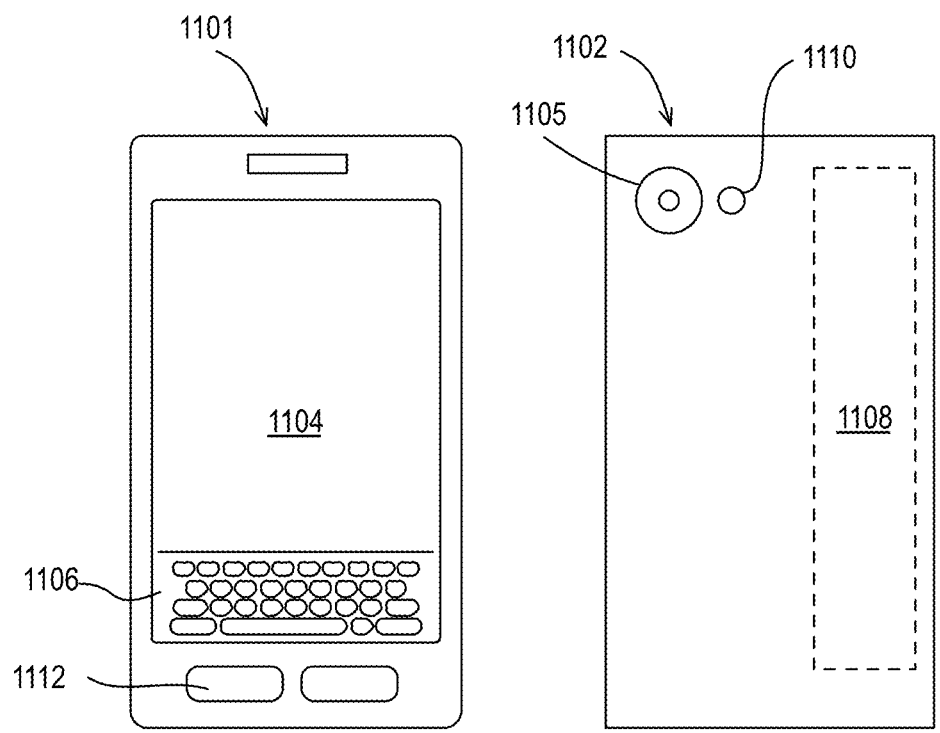
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, imaging device 101, system 900, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for providing automatic object selection from multiple tracked objects for an imaging device comprises tracking at least a first object and a second object across two or more image frames, generating a first object selection metric associated with the first object and a second object selection metric associated with the second object, and selecting the first object or the second object as a target object for tracking based at least in part on the first object selection metric and the second object selection metric.

Further to the first embodiments, the first object selection metric comprises at least one of an accumulated distance from frame center for the first object across the two or more image frames, an accumulated velocity for the first object across the two or more image frames, or a trajectory comparison of a predicted trajectory to an actual trajectory for the first object across the two or more image frames.

Further to the first embodiments, the first object selection metric comprises a weighted sum of an accumulated distance from frame center for the first object across the two or more image frames and an accumulated velocity for the first object across the two or more image frames.

Further to the first embodiments, the first object selection metric comprises a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the first embodiments, the first object selection metric comprises at least one of a weighted sum of an accumulated distance from frame center for the first object across the two or more image frames and an accumulated velocity for the first object across the two or more image frames or a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the first embodiments, the first object selection metric comprises a trajectory comparison of a predicted trajectory to an actual trajectory for the first object across the two or more image frames, wherein the predicted trajectory comprises a closed-loop control predicted trajectory, and wherein the trajectory comparison comprises at least one of a difference between the predicted trajectory and the actual trajectory or a dynamic time warping comparison of the predicted trajectory and the actual trajectory.

Further to the first embodiments, the first object selection metric comprises a trajectory comparison of a predicted object trajectory and an actual object trajectory for the first object.

Further to the first embodiments, the method further comprises detecting multiple objects comprising at least the first object and the second object, performing single object tracking of the target object, performing at least one of an auto focus adjustment, an auto exposure adjustment, or an auto white balance adjustment based at least in part on the target object, and capturing an image based on the auto focus adjustment, auto exposure adjustment, or auto white balance adjustment.

Further to the first embodiments, the method further comprises detecting multiple objects comprising at least the first object and the second object, performing single object tracking of the target object, performing at least one of an auto focus adjustment, an auto exposure adjustment, or an auto white balance adjustment based at least in part on the target object, and capturing an image based on the auto focus adjustment, auto exposure adjustment, or auto white balance adjustment, wherein detecting the multiple objects comprises at least one of a saliency based object detection, a face based object detection, or an image descriptor based object detection.

Further to the first embodiments, tracking the first object comprises generating a filtered trajectory of the first object.

Further to the first embodiments, the method further comprises performing object recognition based on the target object.

In one or more second embodiments, a system for providing automatic object selection from multiple tracked objects for an imaging device comprises a memory configured to store image data and a central processing unit coupled to the memory, wherein the central processing unit comprises object tracking circuitry to track at least a first object and a second object across two or more image frames and automatic object selection circuitry to generate a first object selection metric associated with the first object and a second object selection metric associated with the second object and to select at least the first object or the second object as a target object for tracking based at least in part on the first object selection metric and the second object selection metric.

Further to the second embodiments, the first object selection metric comprises at least one of an accumulated distance from frame center for the first object across the two or more image frames, an accumulated velocity for the first object across the two or more image frames, or a trajectory comparison of a predicted trajectory to an actual trajectory for the first object across the two or more image frames.

Further to the second embodiments, the first object selection metric comprises a weighted sum of an accumulated distance from frame center for the first object across the two or more image frames and an accumulated velocity for the first object across the two or more image frames.

Further to the second embodiments, the first object selection metric comprises a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the second embodiments, the first object selection metric comprises at least one of a weighted sum of an accumulated distance from frame center for the first object across the two or more image frames and an accumulated velocity for the first object across the two or more image frames or a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the second embodiments, the first object selection metric comprises a trajectory comparison of a predicted trajectory to an actual trajectory for the first object across the two or more image frames, wherein the predicted trajectory comprises a closed-loop control predicted trajectory, and wherein the trajectory comparison comprises at least one of a difference between the predicted trajectory and the actual trajectory or a dynamic time warping comparison of the predicted trajectory and the actual trajectory.

Further to the second embodiments, the first object selection metric comprises a trajectory comparison of a predicted object trajectory and an actual object trajectory for the first object.

Further to the second embodiments, the system further comprises object detection circuitry to detect multiple objects comprising at least the first object and the second object, image capture adjustment circuitry to provide at least one of auto focus adjustment, an auto exposure adjustment, or an auto white balance adjustment based at least in part on the target object, and image capture circuitry to capture an image based on the auto focus adjustment, auto exposure adjustment, or auto white balance adjustment, wherein the object tracking circuitry is to perform single object tracking of the target object.

Further to the second embodiments, the system further comprises object detection circuitry to detect multiple objects comprising at least the first object and the second object, image capture adjustment circuitry to provide at least one of auto focus adjustment, an auto exposure adjustment, or an auto white balance adjustment based at least in part on the target object, and image capture circuitry to capture an image based on the auto focus adjustment, auto exposure adjustment, or auto white balance adjustment, wherein the object tracking circuitry is to perform single object tracking of the target object, wherein the object detection circuitry is to detect the multiple objects based on at least one of a saliency based object detection, a face based object detection, or an image descriptor based object detection.

Further to the second embodiments, the object tracking circuitry is to generate a filtered trajectory of the first object.

Further to the second embodiments, the system further comprises object recognition circuitry to perform object recognition based on the target object.

In one or more third embodiments, a system for providing automatic object selection from multiple tracked objects comprises means for tracking at least a first object and a second object across two or more image frames, means for generating a first object selection metric associated with the first object and a second object selection metric associated with the second object, and means for selecting the first object or the second object as a target object for tracking based at least in part on the first object selection metric and the second object selection metric.

Further to the third embodiments, the first object selection metric comprises at least one of an accumulated distance from frame center for the first object across the two or more image frames, an accumulated velocity for the first object across the two or more image frames, or a trajectory comparison of a predicted trajectory to an actual trajectory for the first object across the two or more image frames.

Further to the third embodiments, the first object selection metric comprises a weighted sum of an accumulated distance from frame center for the first object across the two or more image frames and an accumulated velocity for the first object across the two or more image frames.

Further to the third embodiments, the first object selection metric comprises a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the third embodiments, the first object selection metric comprises a trajectory comparison of a predicted trajectory to an actual trajectory for the first object across the two or more image frames, wherein the predicted trajectory comprises a closed-loop control predicted trajectory, and wherein the trajectory comparison comprises at least one of a difference between the predicted trajectory and the actual trajectory or a dynamic time warping comparison of the predicted trajectory and the actual trajectory.

Further to the third embodiments, the system further comprises means for detecting multiple objects comprising at least the first object and the second object, means for performing single object tracking of the target object, means for performing at least one of an auto focus adjustment, an auto exposure adjustment, or an auto white balance adjustment based at least in part on the target object, and means for capturing an image based on the auto focus adjustment, auto exposure adjustment, or auto white balance adjustment.

Further to the third embodiments, the means for tracking the first object comprise means for generating a filtered trajectory of the first object.

In one or more fourth embodiments, at least one machine readable medium comprises a plurality of instructions that in response to being executed on an imaging device, cause the imaging device to provide automatic object selection from multiple tracked objects by tracking at least a first object and a second object across two or more image frames, generating a first object selection metric associated with the first object and a second object selection metric associated with the second object, and selecting at least the first object or the second object as a target object for tracking based at least in part on the first object selection metric and the second object selection metric.

Further to the fourth embodiments, the first object selection metric comprises at least one of an accumulated distance from frame center for the first object across the two or more image frames, an accumulated velocity for the first object across the two or more image frames, or a trajectory comparison of a predicted trajectory to an actual trajectory for the first object across the two or more image frames.

Further to the fourth embodiments, the first object selection metric comprises a weighted sum of an accumulated distance from frame center for the first object across the two or more image frames and an accumulated velocity for the first object across the two or more image frames.

Further to the fourth embodiments, the first object selection metric comprises a weighted sum of an accumulated distance from frame center for the first object across the two or more image frames, an accumulated velocity for the first object across the two or more image frames, and a trajectory comparison of a predicted trajectory to an actual trajectory for the first object across the two or more image frames.

Further to the fourth embodiments, the first object selection metric comprises a trajectory comparison of a predicted trajectory to an actual trajectory for the first object across the two or more image frames, wherein the predicted trajectory comprises a closed-loop control predicted trajectory, and wherein the trajectory comparison comprises at least one of a difference between the predicted trajectory and the actual trajectory or a dynamic time warping comparison of the predicted trajectory and the actual trajectory.

Further to the fourth embodiments, the machine readable medium further comprises instructions that cause the computing device to provide automatic object selection from multiple tracked objects by detecting multiple objects comprising at least the first object and the second object, performing single object tracking of the target object, performing at least one of an auto focus adjustment, an auto exposure adjustment, or an auto white balance adjustment based at least in part on the target object, and capturing an image based on the auto focus adjustment, auto exposure adjustment, or auto white balance adjustment.

Further to the fourth embodiments, tracking the first object comprises generating a filtered trajectory of the first object.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing automatic object selection from multiple tracked objects for image capture by an imaging device comprising:
    receiving multiple image frames for object detection, object tracking, and image capture preparation;
    detecting at least a first object and a second object in at least a first image frame of the multiple image frames;
    tracking at least the first detected object and the second detected object across two or more second image frames of the multiple image frames;
    generating a first object trajectory corresponding to the first tracked object and a second object trajectory corresponding to the second tracked object;
    generating a first object selection metric associated with the first object trajectory and a second object selection metric associated with the second object trajectory, wherein the first object selection metric comprises a first weighted sum comprising a product of a first weight and an accumulated distance from frame center for the first object across at least the two or more second image frames, a product of a second weight and an accumulated velocity for the first object across at least the two or more second image frames, and a product of a third weight and an accumulated position difference between a predicted trajectory position and an actual position for the first object across at least the two or more second image frames and the second object selection metric comprises a second weighted sum comprising a product of the first weight and an accumulated distance from frame center for the second object across at least the two or more second image frames, a product of the second weight and an accumulated velocity for the second object across at least the two or more second image frames, and a product of the third weight and an accumulated position difference between a predicted trajectory position and an actual trajectory position for the second object across at least the two or more second image frames, wherein the first weight is greater than the second weight when an average velocity of the first and second detected objects is less than a threshold and the second weight is greater than the first weight when the average velocity is greater than the threshold;
    selecting the first detected object as a target object responsive to the first object selection metric being less than the second object selection metric;
    capturing, by a camera, an image using exposure settings determined based on the selected target object; and
    storing the captured image frame to memory.

2. The method of claim 1, wherein the predicted trajectory for the first object comprises a closed-loop control predicted trajectory.

3. The method of claim 1, further comprising:
    performing at least one of an auto focus adjustment, an auto exposure adjustment, or an auto white balance adjustment based at least in part on the target object to determine the exposure settings.

4. The method of claim 1, wherein detecting the first and second objects comprises at least one of a saliency based object detection, a face based object detection, or an image descriptor based object detection.

5. The method of claim 1, wherein tracking the first detected object comprises generating a filtered trajectory of the first object.

6. The method of claim 1, further comprising:
performing object recognition based on the target object.

7. The method of claim 1, further comprising:
tracking a third object and a fourth object across two or more third image frames of the multiple image frames;
generating a third object trajectory corresponding to a third tracked object and a fourth object trajectory corresponding to the second tracked object; and
generating a third object selection metric associated with the third object trajectory and a fourth object selection metric associated with the fourth object trajectory, wherein tracking and generating trajectories for the first and second objects is performed at a first frame sampling rate and tracking and generating trajectories for the third and fourth objects is performed at a second frame sampling rate less than the first frame sampling rate.

8. The method of claim 7, wherein the second frame sampling rate is less than the first frame sampling rate responsive to a power management policy or a remaining battery life.

9. A system for providing automatic object selection from multiple tracked objects for image capture by an imaging device comprising:
storage configured to store image data; and
a processor coupled to the storage, the processor to
receive multiple image frames for object detection, object tracking, and image capture preparation;
detect at least a first object and a second object in at least a first image frame of the multiple image frames;
track at least the first detected object and the second detected object across two or more second image frames of the multiple image frames;
generate a first object selection metric associated with the first object trajectory and a second object selection metric associated with the second object trajectory, wherein the first object selection metric comprises a first weighted sum comprising a product of a first weight and an accumulated distance from frame center for the first object across the at least two or more second image frames, a product of a second weight and an accumulated velocity for the first object across at least the two or more second image frames, and a product of a third weight and an accumulated position difference between a predicted trajectory position and an actual position for the first object across at least the two or more second image frames and the second object selection metric comprises a second weighted sum of a product of the first weight and an accumulated distance from frame center for the second object across at least the two or more second image frames, a product of the second weight and an accumulated velocity for the second object across at least the two or more second image frames, and a product of the third weight and an accumulated position difference between a predicted trajectory position and an actual trajectory position for the second object across at least the two or more second image frames, wherein the first weight is greater than the second weight when an average velocity of the first and second detected objects is less than a threshold and the second weight is greater than the first weight when the average velocity is greater than the threshold;
select the first detected object as a target object responsive to the first object selection metric being less than the second object selection metric; and
determine exposure settings based on the selected target object; and
a camera to capture an image using the exposure settings, wherein the storage is to store the captured image.

10. The system of claim 9, wherein the predicted trajectory for the first object comprises a closed-loop control predicted trajectory.

11. The system of claim 9, wherein to determine the exposure settings the processor is to provide at least one of an auto focus adjustment, an auto exposure adjustment, or an auto white balance adjustment based at least in part on the target object.

12. The system of claim 9, wherein the to track the first detected object, the processor is to generate a filtered trajectory of the first object.

13. The system of claim 9, wherein the processor is further to
track a third object and a fourth object across two or more third image frames of the multiple image frames;
generate a third object trajectory corresponding to a third tracked object and a fourth object trajectory corresponding to the second tracked object; and
generate a third object selection metric associated with the third object trajectory and a fourth object selection metric associated with the fourth object trajectory, wherein tracking and generating trajectories for the first and second objects is performed at a first frame sampling rate and tracking and generating trajectories for the third and fourth objects is performed at a second frame sampling rate less than the first frame sampling rate.

14. The system of claim 13, wherein the second frame sampling rate is less than the first frame sampling rate responsive to a power management policy or a remaining battery life of the system.

15. At least one non-transitory machine readable medium comprising a plurality of instructions that in response to being executed on an imaging device, cause the imaging device to provide automatic object selection from multiple tracked objects for image capture by:
receiving multiple image frames for object detection, object tracking, and image capture preparation;
detecting at least a first object and a second object in at least a first image frame of the multiple image frames;
tracking at least the first detected object and the second detected object across two or more second image frames of the multiple image frames;
generating a first object selection metric associated with the first object trajectory and a second object selection metric associated with the second object trajectory, wherein the first object selection metric comprises a first weighted sum comprising a product of a first weight and an accumulated distance from frame center for the first object across at least the two or more second image frames, a product of a second weight and an accumulated velocity for the first object across at least the two or more second image frames, and a product of a third weight and an accumulated position difference between a predicted trajectory position and an actual position for the first object across at least the two or more second image frames and the second object selection metric comprises a second weighted sum comprising a product of the first weight and an accumulated distance from frame center for the second object across at least the two or more second image frames, a product of the second weight and an accumulated velocity for the second object across at least the two or more second image frames, and a product of the third weight and an accumulated position difference between a predicted trajectory position and an actual trajectory position for the second object across at least the two or more second image frames, wherein the first weight is greater than the second weight when an average velocity of the first and second detected objects is less than a threshold and the second weight is greater than the first weight when the average velocity is greater than the threshold;

selecting the first detected object as a target object responsive to the first object selection metric being less than the second object selection metric;

capturing, by a camera, an image using exposure settings determined based on the selected target object; and storing the captured image frame to memory.

16. The machine readable medium of claim 15, wherein the predicted trajectory for the first object comprises a closed-loop control predicted trajectory.

17. The machine readable medium of claim 15 further comprising instructions that cause the computing device to provide automatic object selection from multiple tracked objects for image capture by:

performing at least one of an auto focus adjustment, an auto exposure adjustment, or an auto white balance adjustment based at least in part on the target object to determine the exposure settings.

18. The machine readable medium of claim 15, wherein tracking the first detected object comprises generating a filtered trajectory of the first object.

19. The machine readable medium of claim 15 further comprising instructions that cause the computing device to provide automatic object selection from multiple tracked objects for image capture by:

tracking a third object and a fourth object across two or more third image frames of the multiple image frames;

generating a third object trajectory corresponding to a third tracked object and a fourth object trajectory corresponding to the second tracked object; and generating a third object selection metric associated with the third object trajectory and a fourth object selection metric associated with the fourth object trajectory, wherein tracking and generating trajectories for the first and second objects is performed at a first frame sampling rate and tracking and generating trajectories for the third and fourth objects is performed at a second frame sampling rate less than the first frame sampling rate.

20. The machine readable medium of claim 19, wherein the second frame sampling rate is less than the first frame sampling rate responsive to a power management policy or a remaining battery life.

* * * * *